United States Patent [19]

Honjo et al.

[11] Patent Number: 4,691,247
[45] Date of Patent: Sep. 1, 1987

[54] VIDEO SIGNAL RECORDING/REPRODUCING APPARATUS

[75] Inventors: Masahiro Honjo, Neyagawa; Akio Hashima, Tsuzuki, both of Japan

[73] Assignee: Matsushita Electric Industrial Co., Ltd., Osaka, Japan

[21] Appl. No.: 669,939

[22] Filed: Nov. 9, 1984

[30] Foreign Application Priority Data

Nov. 11, 1983 [JP] Japan .................. 58-212736
Nov. 14, 1983 [JP] Japan .................. 58-214328
Mar. 28, 1984 [JP] Japan .................. 59-61458

[51] Int. Cl.[4] ............................. H04N 9/79
[52] U.S. Cl. ........................... 358/319; 358/324; 358/326; 358/330
[58] Field of Search ............... 358/310, 319, 320, 324, 358/326, 330; 360/33.1, 36.1

[56] References Cited

U.S. PATENT DOCUMENTS 3,018,324 1/1962 Leyton et al. ................. 358/319

FOREIGN PATENT DOCUMENTS 54-8918 1/1979 Japan .

Primary Examiner—Robert L. Richardson
Attorney, Agent, or Firm—Wenderoth, Lind & Ponack

[57] ABSTRACT

A video signal recording/reproducing apparatus for recording and reproducing a video signal onto and from a recording medium with a magnetic head. In this apparatus, the recording chrominance signal processing block is provided with a circuit for producing a continuous oscillation signal having the same frequency, gain and phase with those of a normal color burst signal, a switch for normally passing the chrominance signal and, at a period including the normal color burst signal and longer than the duration of the normal color burst signal, passing the continuous oscillation signal, so that a chrominance signal is obtained at the output of the switch with a duration expanded color burst signal. This chrominance signal is mixed with the frequency converted chrominance signal, and the thus mixed signal is recorded on the recording medium. The duration expanded color burst signal is contracted to the normal duration of color burst signal by a muting circuit in the reproduced chrominance signal processing block.

16 Claims, 33 Drawing Figures

VIDEO SIGNAL RECORDING/REPRODUCING APPARATUS

BACKGROUND OF THE INVENTION

1. Field of the Invention

This invention relates to a magnetic recording/reproducing apparatus, such as a videotape recorder (VTR), which employs a lower-frequency-converted chrominance signal recording system.

2. Description of the Prior Art

Videotape recorders have become remarkably popular in recent years. Most of them employ the low-frequency-converted chrominance signal recording system (M system). The M-system is advantageous in that (1) the chrominance signal is hardly affected by fluctuations in the reproducing time base and (2) the chrominance signal can be recorded and reproduced with good linearity due to the high frequency biasing by the FM signal.

Block diagrams of signal recording and reproducing systems used for conventional VTRs are shown in FIGS. 1 and 2 respectively. For recording, a luminance signal is sent through the lowpass filter (LPF) 1, the frequency modulator 2 where the frequency of the signal is modulated, and the high pass filter (HPF) 3 to the mixer 4. Meanwhile, the chrominance signal is sent through the bandpass filter (BPF) 5, the auto color control circuit (ACC circuit) and the auto phase control circuit (APC circuit) 6, the balanced modulator 7 where the signal is modulated, and the lowpass filter (LPF) 8 to the mixer 4 where the signal is mixed with the luminance signal. The mixed signal is then sent to the recording head 10 through the recording amplifier 9.

For reproduction, the signal is transmitted through substantially the reverse sequence, as shown in FIG. 2, and outputted at the output terminal 21 as a reproduced video signal. Reference numeral 22 indicates the recording luminance signal system block, 23 the recording chrominance signal system block, 24 the reproduced luminance signal system block and 25 the reproduced chrominance signal system block. Signal operations which are well known have been briefly described above, though actual circuitry is more complex.

With the above construction, however, the color burst that has been converted to a low frequency (for example, 629 kHz) is recorded or reproduced for only about one-and-a-half wavelengths. In other words, if the output changes due to dropout or poor tape contact during the one-and-a-half wavelength reproducing time of the color burst, the APC and ACC circuits do not operate satisfactorily, causing color irregularity. This results in lateral noise on the monitor screen, the most conspicuous color noise.

SUMMARY OF THE INVENTION

It is a principal object of the present invention is to improve signal to noise ratio (S/N) of the chrominance signal in a video signal recording/reproducing apparatus by allowing the AGC and APC circuits to operate stably regardless of degradation of the reproduced video signal, thereby eliminating color irregularity or lateral noise of the reproduced picture.

Another object of the present invention is to reduce the disturbance of the frequency modulated luminance signal to the low-frequency-converted chrominance signal.

The main concept of the present invention for achieving the above objects is to expand the duration of the normal color burst signal in the recording system and contract the expanded color burst signal to the normal color burst signal in the reproducing system. The expansion of the duration of the color burst signal is accomplished by producing a continuous oscillation signal having the same amplitude and phase as those of the normal color burst signal and replacing the part including the normal color burst signal and substantially wider than the duration of the normal color burst signal by the continuous oscillation signal. The continuous oscillation signal can be obtained from the color subcarrier signal (3.58 MHz in NTSC) or from the low-frequency-converted color subcarrier signal 629 kHz in a VHS system VTR).

Accordingly, the video signal recording/reproducing apparatus of the present invention is provided therein with a replacing signal producing means for producing a continuous oscillation signal having the same amplitude and phase as those of the normal color burst signal to be replaced thereby; a switch means for normally passing the chrominance signal and, at the neighbor of the color burst signal, passing the continuous oscillation signal, so as to thereby obtain a chrominance signal with a duration expanded color burst signal. A timing pulse generating means is also provided for producing a timing pulse for controlling the switch means. Such a color burst signal expanding means comprising the replacing signal producing means, the switching means and the timing pulse generating means may be located at any stage in the recording system.

A muting means is provided in the reproducing system for eliminating the expanded portion of the color burst signal so as to recover the normal color burst signal having its original duration.

Further, it is preferable to limit the frequency band of the luminance signal in the recording system during the period corresponding to the duration of the expanded color burst signal so as to reduce the influence of the high frequency component of the luminance signal on the color burst signal.

The above and other objects, features and advantages of the invention will be apparent from consideration of the following description taken in connection with the accompanying drawings in which:

DESCRIPTION OF THE PREFERRED EMBODIMENTS

Figure 1:
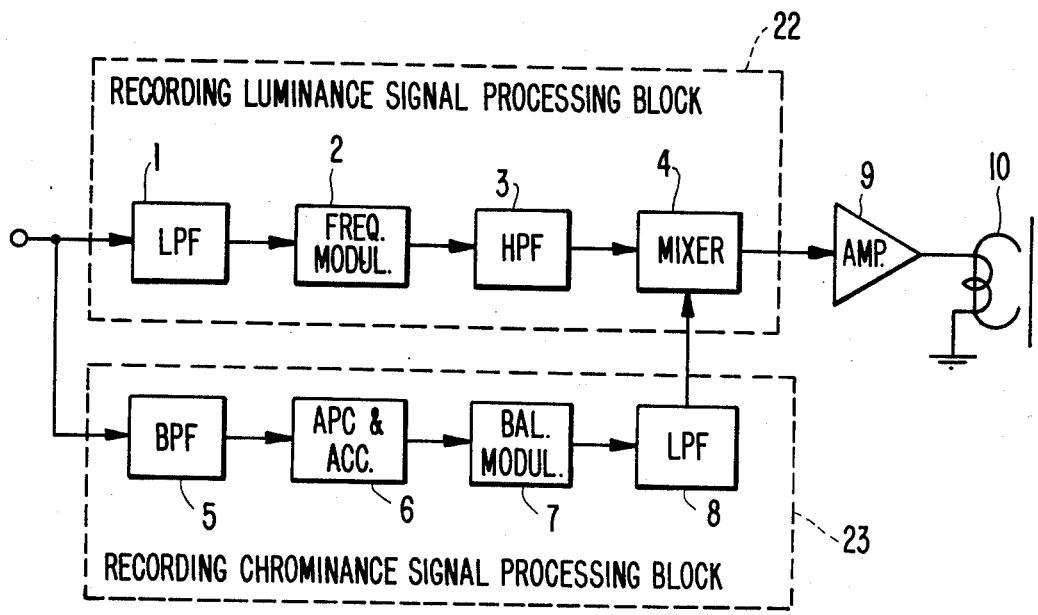
FIG. 1 is a block diagram of a conventional recording system.
Figure 2:
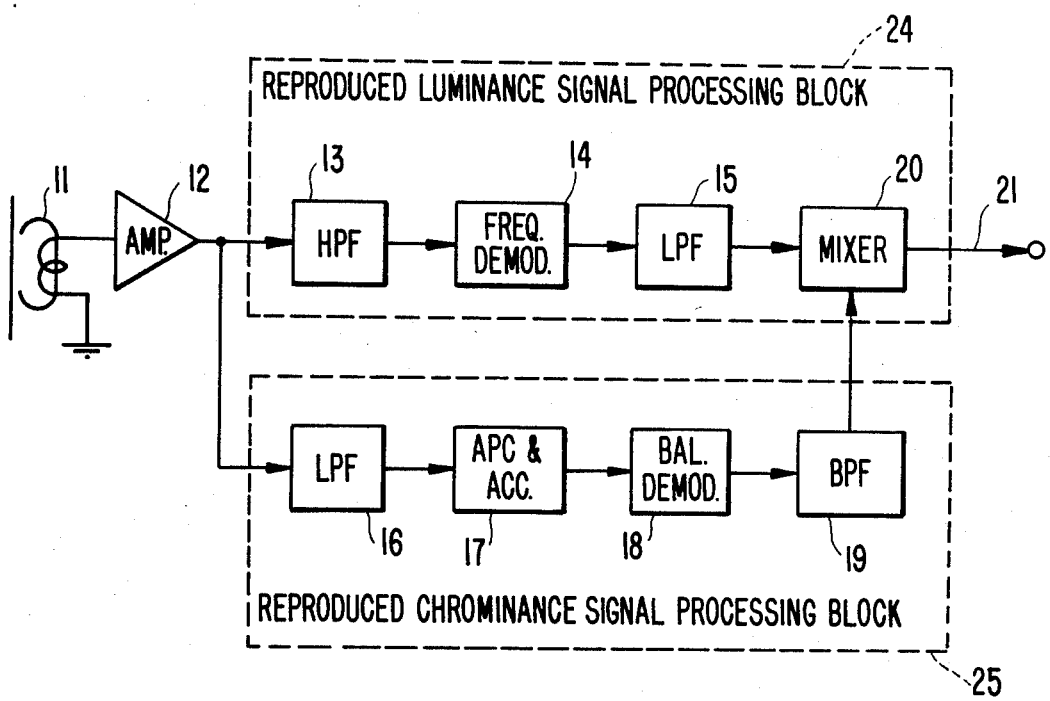
FIG. 2 is a block diagram of a conventional reproducing system.
Figure 3A:
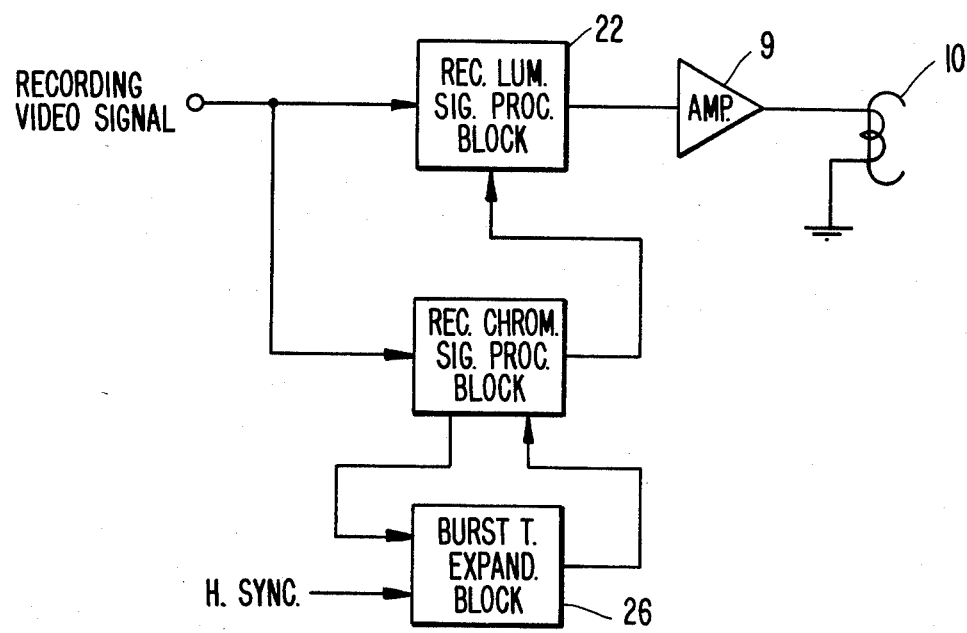
FIGS. 3(A) and (B) are block diagrams of recording and reproducing systems, respectively, of an embodiment of this invention.
Figure 3B:
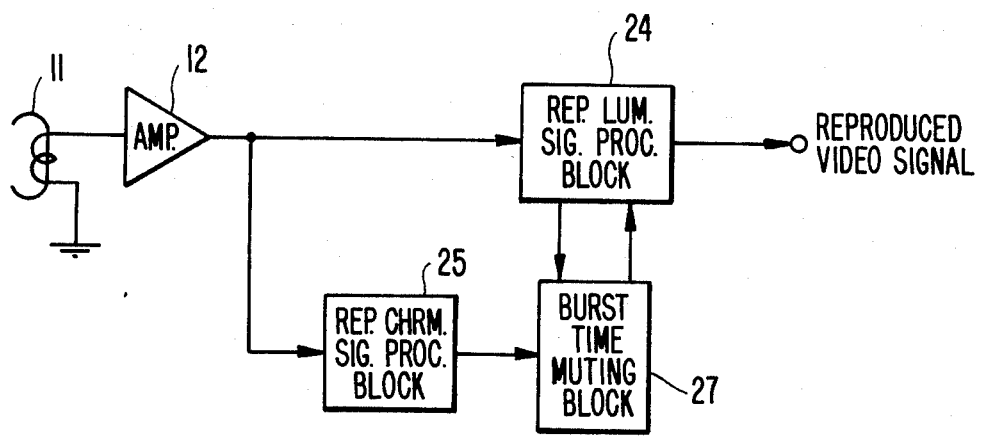

FIGS. 3(A) and (B) are block diagrams of the recording and reproducing systems of one embodiment of this invention, respectively. Referring to FIGS. 3(A) and (B), a burst time expanding block 26 is added to the recording system shown in FIG. 1, and a burst time muting block 27 is added to the reproducing system shown in FIG. 2. The burst time is expanded by the burst time expanding block 26 in the recording system and muted to normal duration by the burst time muting block 27 in the reproducing system.

Figure 4:
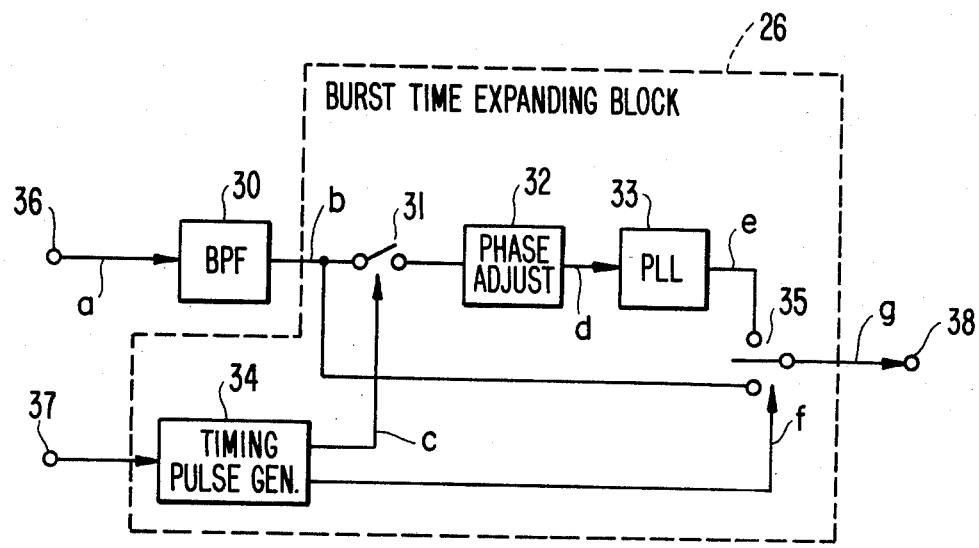
FIG. 4 is a block diagram showing an embodiment of the burst time expanding block used in this invention.
Figure 5:
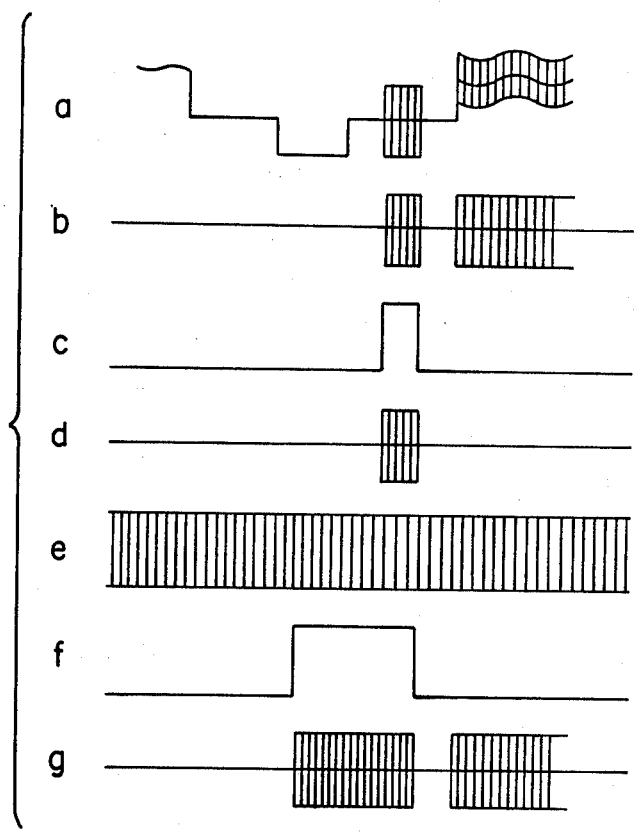
FIG. 5 consisting of a–g shows signal waveform of each part of the diagram in FIG. 4.

An embodiment of the burst time expanding block 26 is shown in detail in FIG. 4 and signal waveform of each part thereof is shown in FIG. 5. The block in FIG. 4 is composed of a bandpass filter (BPF) 30, a phase adjusting circuit 32, a PLL circuit 33, a timing pulse generating circuit 34 and switches 31, 35.

Video signal "a" is inputted through a terminal 36 to the BPF 30, where chrominance signal "b" is separated. The separated chrominance signal is either applied to the phase adjusting circuit 32 through the switch 31 responsive to a timing pulse "c" or passed to an output terminal 38 through the switch 35 responsive to a timing pulse "f". The timing pulses "c" and "f" are generated by the timing pulse generating circuit 34 from the horizontal synchronizing signal inputted through a terminal 37. The timing pulse "c" controls the switch 31 to pass only the burst signal portion of the chrominance signal "b" to the phase adjusting circuit 32, where the extracted burst signal is phase-adjusted. The phase-adjusted burst signal "d" is applied to the PLL circuit 33. The PLL circuit 33, which is phase-locked with the burst signal "d", generates a 3.58 MHz (exactly, 3.579545 Mz) signal "e". The 3.58 MHz signal "e" is passed to the timing pusle "f". Accordingly, a signal "g" appearing at the output terminal 38 through the switch 35 according to the time pulse "f". Accordingly, a signal "g" appearing at the output terminal 38 is a signal composed of a duration expanded burst signal and chrominance signal. The duration expanded burst signal starts at the leading edge of the horizontal synchronizing signal and ends at the end of the original burst signal.

Figure 6:
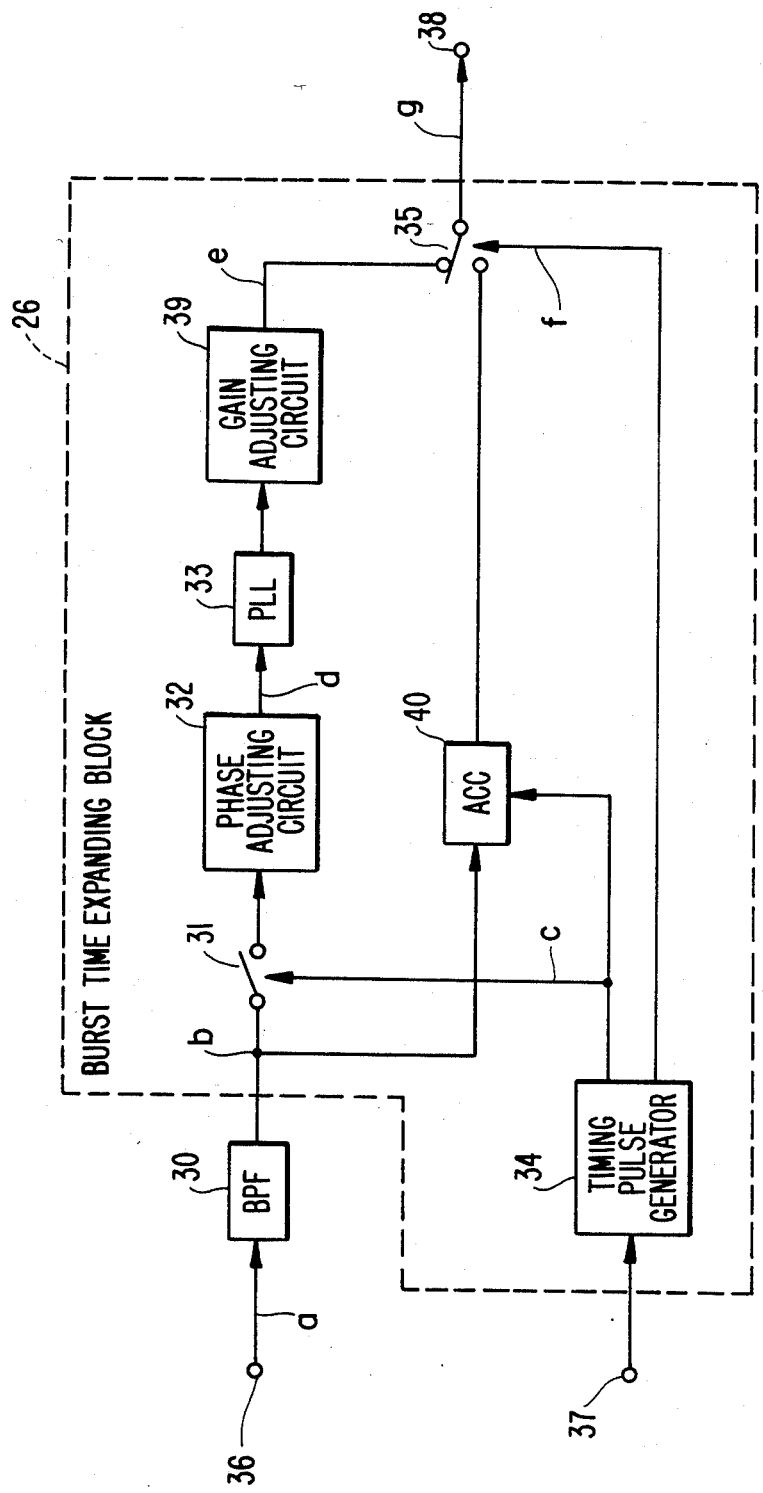
FIG. 6 is a block diagram showing another example of the burst time expanding block used in this invention.

Another embodiment of the burst time expanding block 26 is shown in FIG. 6, signal waveform of each part thereof being the same as that shown in FIG. 5. The embodiment of FIG. 6 differs from that of FIG. 4 in that a gain adjusting circuit 39 is inserted between the PLL circuit 33 and the switch 35 and that a ACC circuit 40 controlled by the timing pulse "c" is inserted between the BPF 30 and the switch 35. The gain adjusting circuit 39 amplifies the amplitude of the 3.58 MHz signal from the PLL circuit 33 to be an appropriate amplitude. The ACC circuit 40 amplifies the burst signal of the chrominance signal "b" from the BPF 30 to be a constant signal level.

Figure 7:
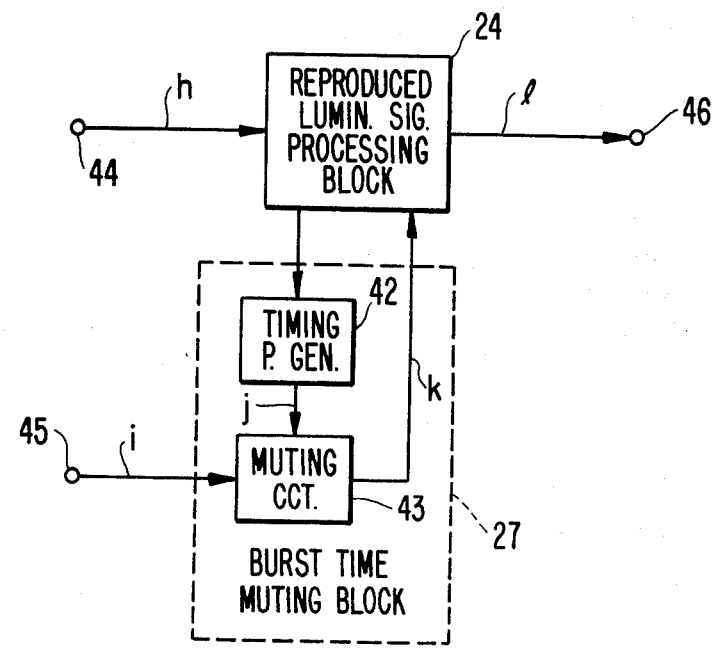
FIG. 7 is a block diagram showing the essential portion of the reproducing system according to this invention.
Figure 8:
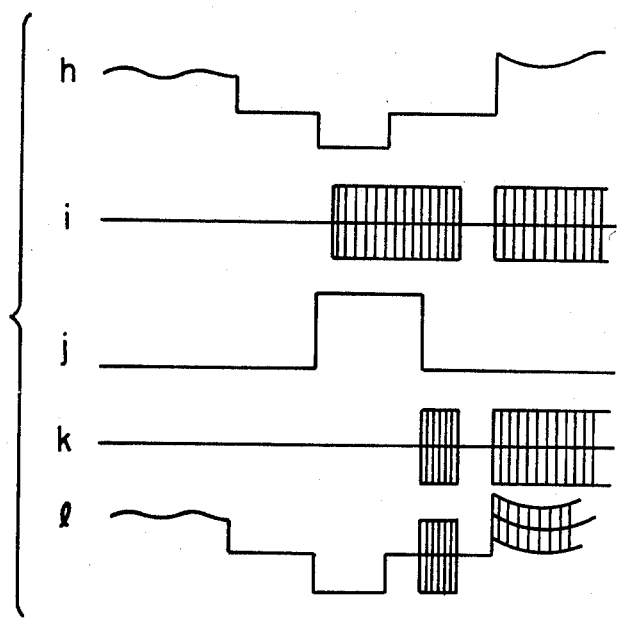
FIG. 8 shows signal waveform of each part of the diagram in FIG. 7.

An embodiment of the burst time muting block 27 is shown in FIG. 7 and signal waveform of each part thereof is shown in FIG. 8. Reproduced chrominance signal "i" is transmitted through a terminal 45 to a muting circuit 43, which is responsive to a timing pulse "j" produced by a timing pulse generating circuit 42 and mutes, or eliminates, the expanded portion of the expanded burst signal so as to produce the original chrominance signal "k" which is the same signal as FIG. 5 "b" signal. The signal "k" is then mixed with luminance signal "h" at the reproduced luminance signal system block 24 and outputted to a terminal 46 as a reproduced video signal "l". Here, the timing pulse generating circuit 42 is responsive to the horizontal synchronizing signal for producing the timing pulse "j" which starts at the leading edge of the horizontal synchronizing signal and ends at the starting time of the normal burst signal.

Figure 9A:
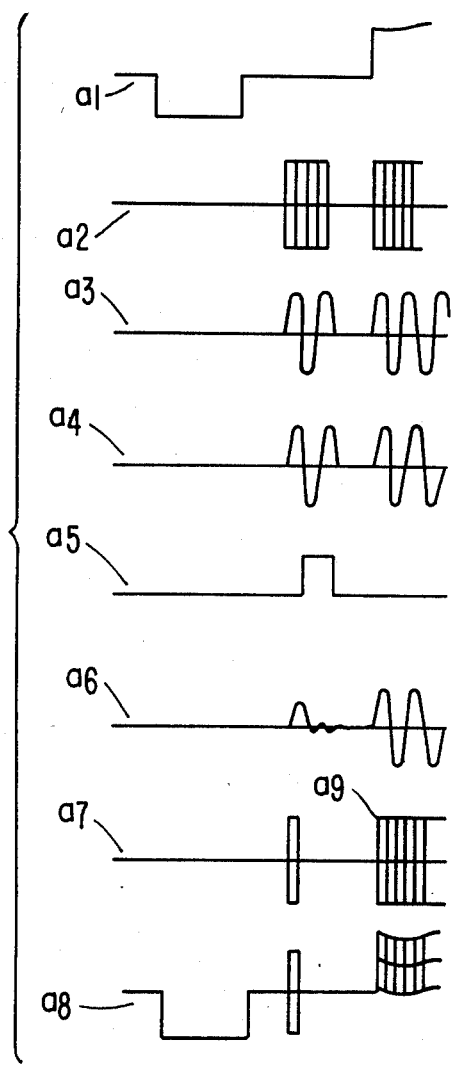
FIGS. 9(A) and (B) shows signal waveforms by the conventional apparatus in comparison with the present invention.
Figure 9B:
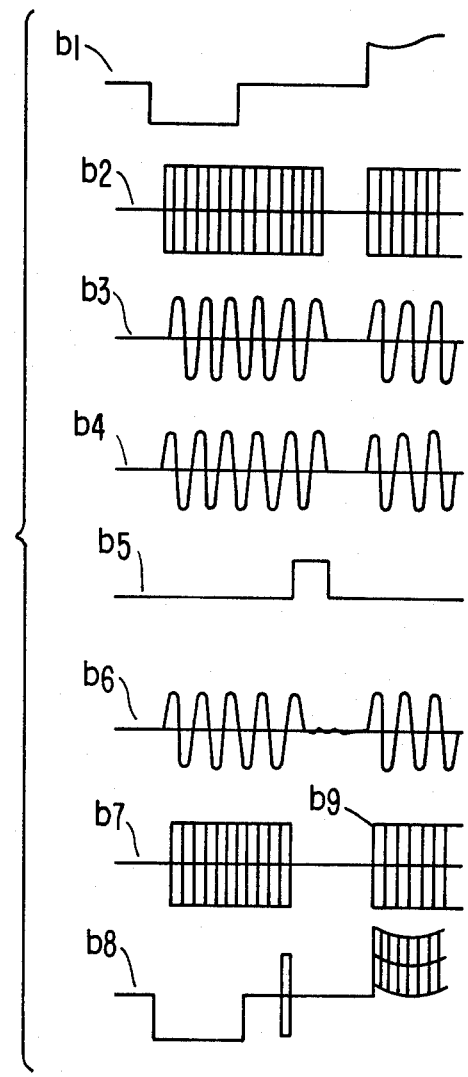

The advantages of this invention will be described in comparison with the conventional system with reference to FIGS. 9(A) and 9(B). FIG. 9(B) shows reproduction process by this invention, and 9(A) that by the conventional system in such a case that noise is contained in the reproduced burst signal. Signals $a_1$ and $b_1$ are input luminance signals; $a_2$ a conventional chrominance signal; $b_2$ a composite chrominance signal with the expanded color burst signal; $a_3$ and $b_3$ the chrominance signals converted to low frequency; $a_4$ and $b_4$ reproduced low frequency chrominance signals with no dropout; $a_5$ and $b_5$ waveforms showing a dropout period; $a_6$ $b_6$ reproduced low frequency chrominance signals with dropouts occuring during $a_5$ and $b_5$ periods respectively; $a_7$ and $b_7$ the reproduced chrominance signals after being converted to high frequency of 3.579545 MHz; and $a_8$ and $b_8$ reproduced video signals obtained by mixing the chrominance signals $a_7$ and $b_7$ with the reproduced luminance signals. In the case of the conventional system, a major portion of the color burst is not reproduced when dropout occurs as shown by $a_6$. As a result, the ACC and APC circuits do not operate satisfactorily, and therefore phase and gain are not secured for the reproduced chrominance signal as shown by $a_9$, which results in color phase irregularity and lateral noises. According to the present invention, on the contrary, since four wavelengths of the color burst converted to low frequency are completely reproduced as shown by $b_6$, ACC and APC circuits operate satisfactorily so that phase and gain are secured for the reproduced chrominance signal as shown by $b_9$. Therefore, no color phase irregularity and lateral noises occur. Thus, it is understood that color noise is substantially reduced by the present invention.

Figure 10A:
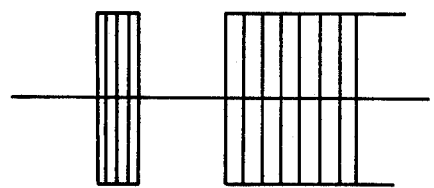
FIGS. 10(A) and (B) and FIGS. 11(A) to (G) are waveforms for explaining other embodiments of this invention.
Figure 10B:
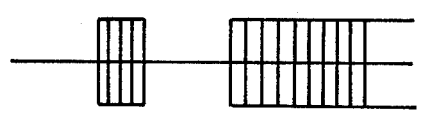
Figure 11A:
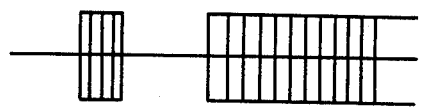
Figure 11B:
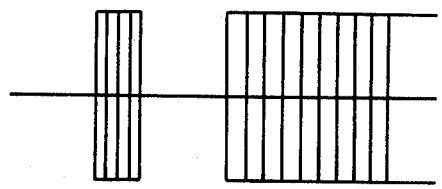
Figure 11C:
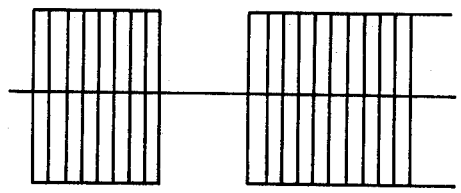
Figure 11D:
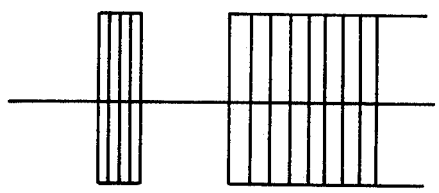
Figure 11E:
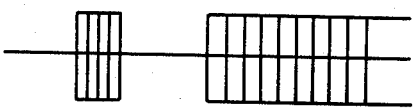
Figure 11F:
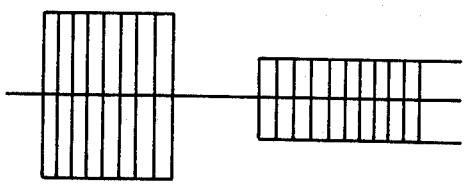
Figure 11G:
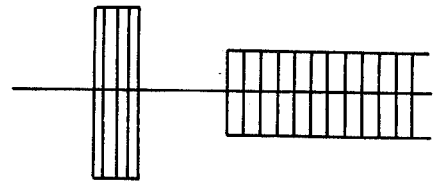

Other aspects of this invention are expalined with reference to FIGS. 10(A)–(B) and 11(A)–(G) Generally, the chrominance signal level of the video signal is not always constant. FIG. 10(A) shows a normal chrominance signal level and FIG. 10(B) a chrominance signal level which is lower than the normal level. For input of the lower level signal of FIG. 10(B), waveforms obtained when the ACC circuit 40 is provided before the select switch 35 as shown in FIG. 6 are shown in FIGS. 11(A) to (D); and those obtained without the ACC circuit are shown in FIGS. 11(E) to (G).

FIGS. 11(A) and (E) are the lower level input chrominance signals; (B) the output signal from the ACC circuit; (C) the chrominance signal with the expanded burst signal; and (D) the reproduced chrominance signal. On the other hand, FIG. 11 (F) is the chrominance signal with the expanded burst signal when the ACC circuit not provided; and (G) is the reproduced chrominance signal in that case.

As can be understood from FIGS. 11(A)–(G), the level of chrominance signal is kept constant by the ACC circuit before the burst replacing stage. Therefore, the level of the chrominance signal or the color density, with respect to the color burst, remains the same as that of the input signal even after the burst replacement by the expanded burst signal. When the ACC circuit is omitted, however, the level of the chrominance signal with respect to the color burst changes with the burst replacement. That is, the color density in reproduction is different to that in the input recording signal.

Accordingly, the ACC circuit permits replacement of the color burst by the output signal of the PLL circuit, as well as adjustment in phase and gain with no change in hue and saturation, whatever level of chrominance signal may be inputted.

In the FIG. 6 embodiment, the BPF 30 may be omitted, and the phase adjusting circuit 32 may be located after the PLL circuit 33 or omitted. The gain adjusting circuit 39 may be located before the ACC circuit 40 or omitted.

Figure 12:
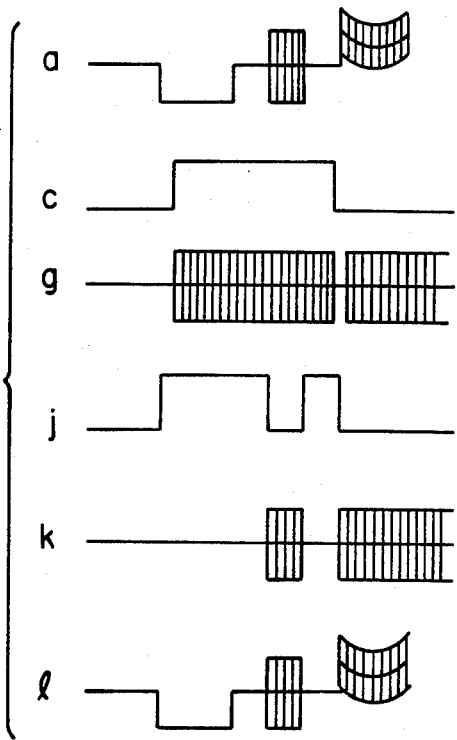
FIG. 12 shows waveforms of some examples of the timing pulse in this invention.

The timing pulse generating circuit 34 can generate various timing pulses. An example is shown in FIG. 12, in which "a" is the input video signal, "c" is the timing pulse for the recording system, "g" is the burst expanded chrominance signal, "j" is the timing pulse for the reproduction system, "k" is the reproduced chrominance signal after being muted and "l" is the reproduced video signal. The time constants of the AGC and APC may be changed depending upon the period of the timing pulse.

Figure 13:
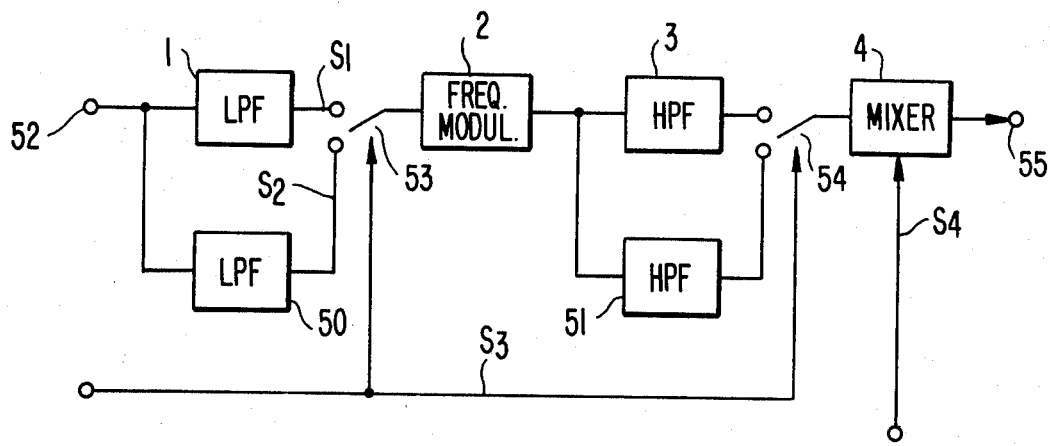
FIG. 13 is a block diagram of the luminance signal recording system of this invention.
Figure 14:
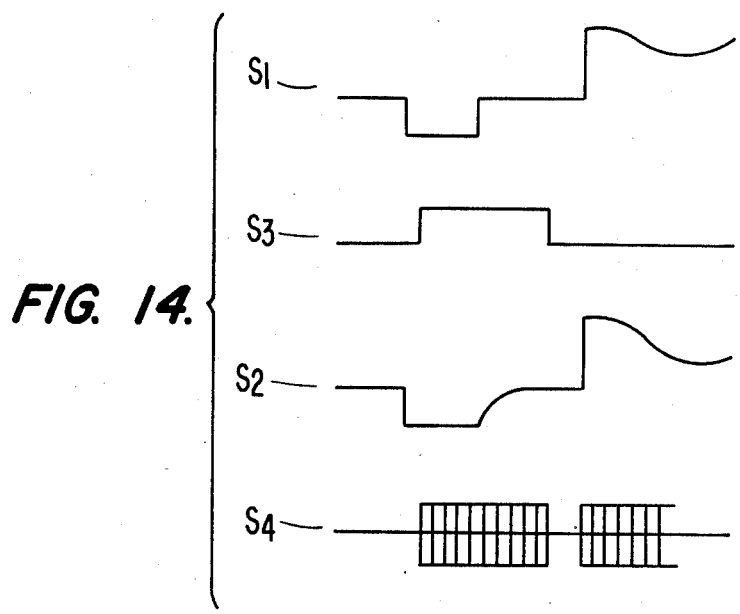
FIG. 14 shows signal waveform of each part of the diagram in FIG. 13.

Next, an embodiment of the luminance signal recording block 22 is shown in FIG. 13, and the signal waveform of each part thereof is shown in FIG. 14. Video signal inputted from an input terminal 52 is usually passed through a lowpass filter (LPF) 1, a switch 53, a frequency modulator 2, a highpass filter (HPF) 3 and a switch 54 to a mixer 4. But, when a timing pusle $S_3$ is applied to the switches 53 and 55, the input video signal is passed through a low-pass filter (LPF) 50, the switch 53, the frequency modulator 2, a high-pass filter (HPF) 51 and the switch 54 to the mixer 4. The output signals of the LPF 1 and LPF 50 are luminance signals $S_1$ and $S_2$, respectively.

Since the cutoff frequency of the LPF 50 is set lower than the cutoff frequency of the LPF 1, the high frequency component of the rising edge of the horizontal synchronizing signal of the luminance signal $S_2$ is reduced, so that the rising edge is smoothed. The cutoff frequency of the HPF 51 is set higher than the cutoff frequency of the HPF 3. The luminance signal composed of partly $S_1$ and partly $S_2$ according to the timing pulse $S_3$ is mixed with the chrominance signal with expanded burst signal $S_4$ at the mixer 4.

Figure 15A:
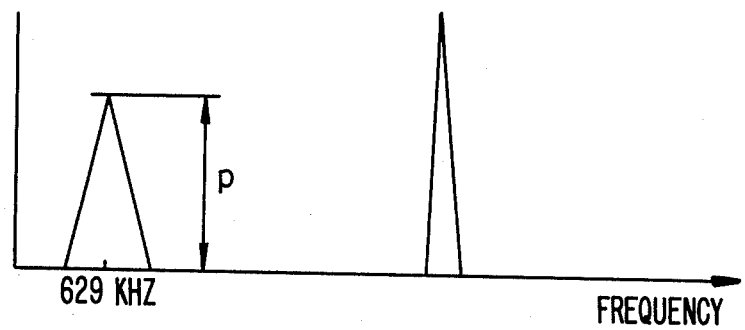
FIG. 15, (A)–(C), shows frequency spectrum of the diagram in FIG. 13.
Figure 15B:
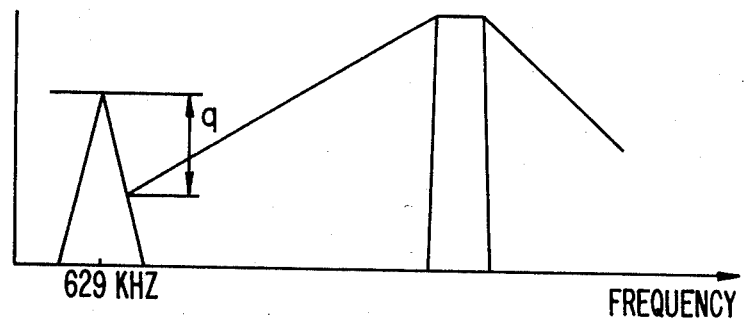
Figure 15C:
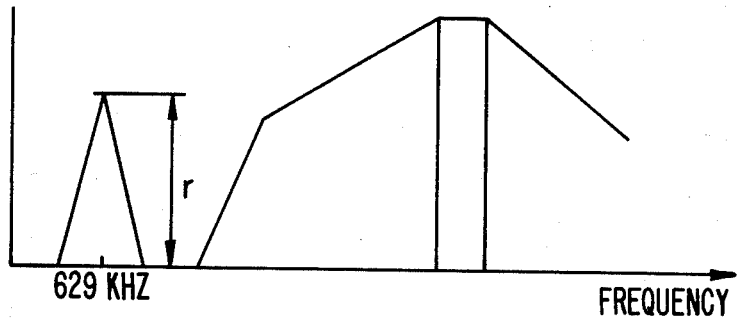

The high frequency component of rising edge of the horizontal synchronizing signal causes a noise with respect to the chrominance signal converted to low frequency. The frequency spectrum of the recording signal, whose color burst signal is located at the pedestal portion, is shown in FIG. 15(A). The color burst signal is converted to a low frequency of 629 kHz. The S/N of the color burst signal is "p". The frequency spectrum of the recording signal with the expanded color burst signal is shown in FIG. 15(B). The S/N of the color burst signal in this case is "q", which is worse than the S/N "p" in FIG. 15(A) due to the high frequency components of rising edge of the horizontal synchronizing signal. The frequency spectrum of the recording signal, when the color burst signal is replaced by the expanded color burst signal and the frequency band of the luminance signal is limited, is shown in FIG. 15 (C). The S/N of the color burst signal in this case is "r", which is the same level as the S/N "p" in FIG. 15(A).

Accordingly, it is necessary to limit the high frequency of the luminance signal to improve the S/N of the color burst signal. Thus, in the FIG. 13 embodiment, the LPF 50 and the HPF 51 are provided for limiting the frequency band of the luminance signal during the period corresponding to the duration of the expanded color burst signal. One of the LPF 50 with the switch $S_1$ and the HPF 51 with the switch 54 may be omitted.

In the above described embodiments, the PLL circuit is synchronized with the carrier frequency (3.579545 MHz in the NTSC) system of the color burst of the chrominance signal, but it may be synchronized with the color burst of the chrominance signal converted to a low frequency, for example 629 kHz in the case of a VHS system VTR. In other words, the frequency for replacing the normal color burst signal may be the carier frequency of the color burst signal or may be the low-frequency converted frequency.

Figure 16:
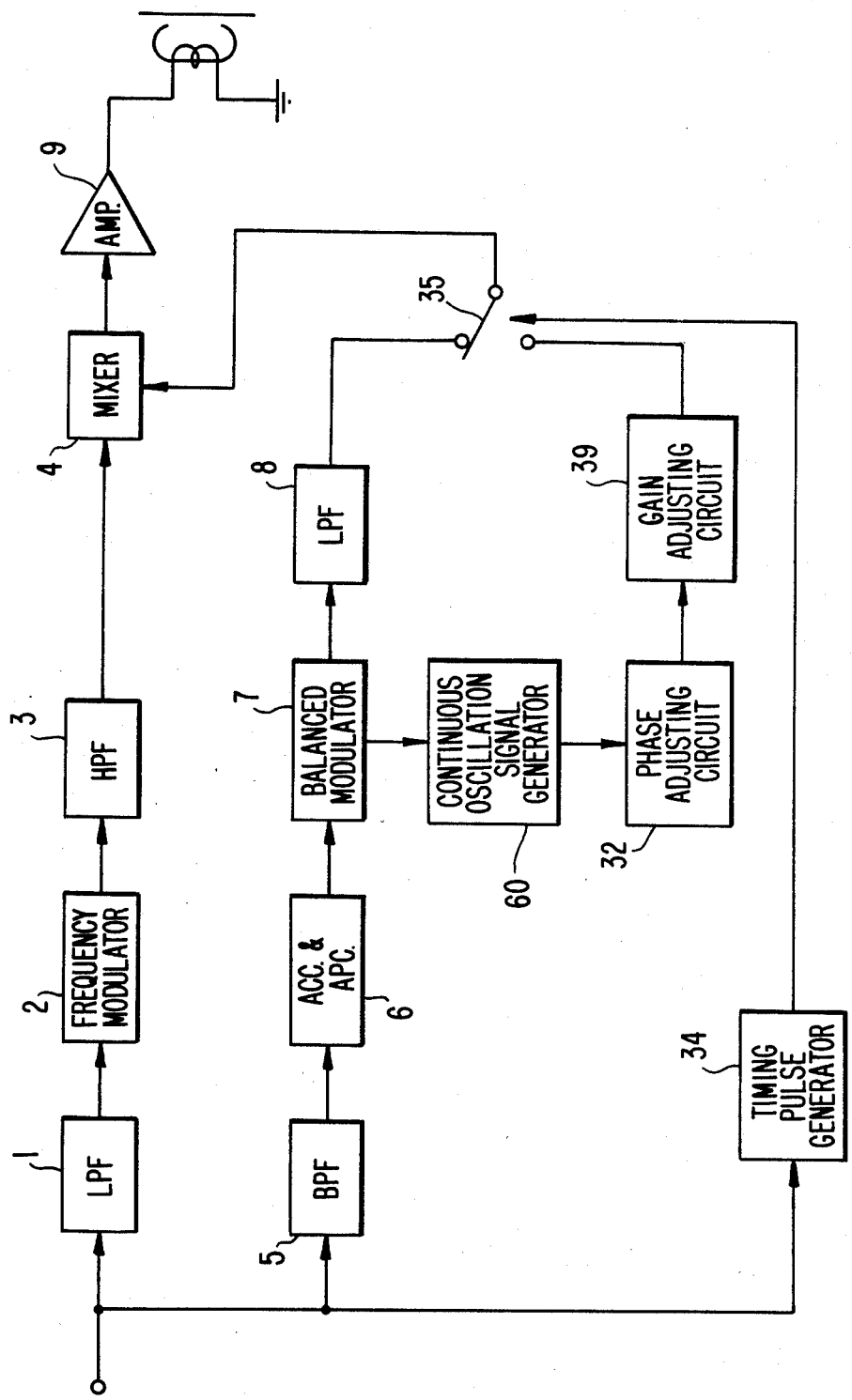
FIG. 16 is a block diagram of still another embodiment of the apparatus of this invention.

FIG. 16 shows an embodiment in which the color burst signal is expanded after it is converted to the low frequency signal. A continuous oscillation signal generating circuit 60 extracts a continuous oscillation signal (for example, 629 kHz) from the balanced modulator 7. The continuous oscillation signal is adjusted in phase and gain by the phase adjusting circuit 32 and the gain adjusting circuit 39 so as to be the same in phase and gain as the low-frequency converted normal color burst signal. The normal color burst signal is replaced by the continuous oscillation signal having a longer duration by the switch 35 responsive to a timing pulse produced by the timing pulse generating circuit 34 in the same way as the above described embodiments. Some of the lately used balanced modulators produce therein the continuous 629 kHz signal. In this case, the continuous oscillation signal generating circuit 60 may be omitted.

Although some embodiments of the invention have been described, it should be understood that various changes and modifications are possible from the foregoing description without departing from the scope of the invention.

What is claimed is:

1. In a video signal recording/reproducing apparatus comprising means for separating an input video signal into a luminance signal and a chrominance signal including a color burst signal, a recording luminance signal processing means for frequency-modulating said luminance signal to obtain a frequency-modulating luminance signal, a recording chrominance signal processing means for converting a frequency band of said chrominance signal to a low frequency band to obtain a low-frequency converted chrominance signal including a low-frequency converted color burst signal, a means for mixing said frequency-converted luminance signal and said low-frequency converted chrominance signal to obtain a recordable video signal, a means for recording said recordable video signal on a recording medium and reproducing said recordable video signal from said recording medium to obtain a reproduced recordable video signal, a means for separating said reproduced recordable video signal into a reproduced frequency-modulated luminance signal and a reproduced low-frequency converted chrominance signal including a reproduced low-frequency converted color burst signal, a reproduced luminance signal processing means for frequency-demodulating said reproduced frequency-modulated luminance signal to obtain a reproduced luminance signal, a reproduced chrominance signal processing means for converting said low frequency band of said reproduced low-frequency converted chrominance signal to said frequency band of said chrominance signal to obtain a reproduced chrominance signal including a reproduced color burst signal, and a means for mixing said reproduced luminance signal and said reproduced chrominance signal to obtain a reproduced video signal, the improvement comprising a color burst expanding means provided in said recording chrominance signal processing means for expanding an original duration of said color burst signal or said low-frequency converted color burst signal to a specific expanded duration.

2. An apparatus according to claim 1, wherein said color burst expanding means comprises:
- a continuous oscillation signal generating means for generating a continuous oscillation signal having frequency, gain and phase which are same as those of said color burst signal;
- a timing pulse generating means for generating a timing pulse having a duration lasting during a period including said color burst signal and longer than said original duration of said color burst signal; and
- a switch means which normally passes said chrominance signal and is responsive to said timing pulse for passing said continuous oscillation signal during the duration of said timing pulse, thereby replacing said color burst signal by said continuous oscillation signal as a duration expanded color burst signal.

3. An apparatus according to claim 2, wherein said continuous oscillation signal generating means comprises a phase-lock loop circuit synchronized with frequency of the color burst signal.

4. An apparatus according to claim 3, wherein said continuous oscillation signal generating means further comprises a phase adjusting circuit for adjusting the phase of the continuous oscillation signal so as to be the same as that of said color burst signal.

5. An apparatus according to claim 4, wherein said continuous oscillation signal generating means further comprises a gain adjusting circuit for adjusting gain of the continuous oscillation signal so as to be the same as that of said color burst signal.

6. An apparatus according to claim 2, wherein said reproduced chrominance signal processing means includes a muting means for eliminating a portion of the reproduced color burst signal so as to obtain the original duration of said color burst signal.

7. An apparatus according to claim 1, wherein the specific expanded duration begins at a leading edge of the horizontal synchronizing signal and ends at the end of the original duration of the color burst signal.

8. The apparatus according to claim 1, wherein said color burst expanding means comprises:
- a continuous oscillation signal generating means for generating a continuous oscillation signal having frequency, gain and phase which are same as those of said low-frequency converted color burst signal;
- a timing pulse generating means for generating a timing pulse having a duration lasting during a period including said low-frequency converted color burst signal and longer than said original duration of said low-frequency converted color burst signal; and
- a switch means which normally passes said low-frequency converted chrominance signal and is responsive to said timing pulse for passing said continuos oscillation signal during the duration of said timing pulse, thereby replacing said low-frequency converted color burst signal by said continuous oscillation signal as a duration expanded low-frequency converted color burst signal.

9. An apparatus according to claim 8, wherein said continuous oscillation signal generating means extracts the continuous oscillation signal from a balanced modulator which is provided in said recording chrominance signal processing means for converting the frequency band of said chrominance signal to the low frequency band to obtain the low-frequency converted chrominance signal.

10. In a video signal recording/reproducing apparatus comprising means for separating an input video signal into a luminance signal and a chrominance signal including a color burst signal, a recording luminance signal processing means for frequency-modulating said luminance signal to obtain a frequency-modulated luminance signal, a recording chrominance signal processing means for converting a frequency band of said chrominance signal to a low frequency band to obtain a low-frequency converted chrominance signal including a low-frequency converted chrominance signal including a low-frequency converted color burst signal, a means for mixing said freequency-converted luminance signal and said low-frequency converted chrominance signal to obtain a recordable video signal, a means for recording said recordable video signal on a recording medium and reproducing said recordable video signal from said recording medium to obtain a reproduced recordable video signal, a means for separating said reproduced recordable video signal into a reproduced frequency-modulated luminance signal and a reproduced low-frequency converted chrominance signal including a reproduced low-frequency converted color burst signal, a reproduced luminance signal processing means for frequency-demodulating said reproduced frequency-modulated luminance signal to obtain a reproduced luminance signal, a reproduced chrominance signal processing means for converting said low frequency band of said reproduced low-frequency converted chrominance signal to said frequency band of said chrominance signal to obtain a reproduced chrominance signal including a reproduced color burst signal, and a means for mixing said reproduced luminance signal and said reproduced chrominance signal to obtain a reproduced video signal, the improvement comprising a color burst expanding means provided in said recording chrominance signal processing means for expanding an original duration of said color burst signal,
wherein said color burst expanding means comprises:

a timing pulse generator which produces from a horizontal synchronizing signal of said input video signal a first timing pulse having a duration lasting at most during said original duration of said color burst signal and a second timing pulse having a duration lasting a period including said color burst signal and longer than said original duration of said color burst signal;

a first switch responsive to said first timing pulse for passing said color burst signal during the duration of said first timing pulse;

a phase adjusting circuit for adjusting a phase of said color burst signal passed through said first switch;

a phase-lock loop coupled to said phase adjusting circuit for producing a continuous oscillation signal having frequency and phase which are same as those of said color burst signal; and a second switch which normally passes said chrominance signal and is repsonsive to said second timing pulse for passing and continuous oscillation signal from said phase-lock loop during the duration of said second timing pulse, thereby replacing said color burst signal by said continuous oscillation signal as a duration expanded color burst signal.

11. An apparatus according to claim 10, wherein second timing pulse starts at the leading edge of the horizontal synchronizing signal and ends at the end of the original duration of the color burst signal.

12. An apparatus according to claim 10, further comprising a gain adjusting circuit provided between said phase-lock loop and said second switch for adjusting the gain of the continuous oscillation signal from said phase-lock loop so as to be the same as that of said color burst signal.

13. An apparatus according to claim 12, wherein said recording chrominance signal processing means further comprises an automatic color control circuit for keeping constant the level of the chrominance signal.

14. An apparatus according to claim 10, wherein said reproduced chrominance signal processing means includes a muting circuit for eliminating a portion of the reproduced color burst signal so as to obtain a reproduced color burst signal having the original duration.

15. An apparatus according to claim 10, wherein said recording luminance signal processing means includes a filter circuit for limiting a frequency band of the luminance signal, and a switch for allowing the luminance signal to pass said filter circuit during a period corresponding to the duration of the expanded color burst signal.

16. An apparatus according to claim 1, wherein said recording luminance signal processing means includes a filter circuit for limiting a frequency band of the luminance signal, and a switch means for allowing the luminance signal to pass through said filter circuit during a period corresponding to the specific expanded duration.

* * * * *